(12) United States Patent
Samuels et al.

(10) Patent No.: US 8,552,128 B2
(45) Date of Patent: Oct. 8, 2013

(54) POLYMER PROCESSING SIMPLIFICATION

(75) Inventors: George J Samuels, Williamsville, NY (US); Gregory J Shafer, Newark, DE (US); Hang T Pham, Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 11/961,087

(22) Filed: Dec. 20, 2007

(65) Prior Publication Data

US 2008/0153955 A1 Jun. 26, 2008

Related U.S. Application Data

(60) Provisional application No. 60/871,035, filed on Dec. 20, 2006.

(51) Int. Cl.
*C08F 2/00* (2006.01)
*C08F 12/20* (2006.01)

(52) U.S. Cl.
USPC ........... 526/208; 526/209; 526/212; 526/213; 526/216; 526/242; 526/249; 526/255; 526/319; 526/329.4; 526/330; 526/332; 526/342; 526/347; 526/347.1; 526/348.6; 526/348.8

(58) Field of Classification Search
USPC .......................................... 526/242, 249, 255
See application file for complete search history.

(56) References Cited

U.S. PATENT DOCUMENTS

| | | | |
|---|---|---|---|
| 2,559,640 A | 7/1951 | Kruger | |
| 2,787,646 A * | 4/1957 | Haszeldine | 570/160 |
| 2,915,510 A | 12/1959 | Hoyt | 260/87.7 |
| 2,917,497 A | 12/1959 | Honn | 260/87.5 |
| 2,919,263 A | 12/1959 | Kahrs et al. | |
| 2,970,988 A | 2/1961 | Lo | |
| 2,975,164 A | 3/1961 | Crawford | 260/87.5 |
| 3,053,818 A | 9/1962 | Honn et al. | |
| 3,240,757 A | 3/1966 | Sterling | |
| 3,324,069 A | 6/1967 | Koblitz et al. | |
| 3,716,599 A | 2/1973 | Vasta | 260/859 |
| 3,812,066 A | 5/1974 | Stone et al. | |
| 3,847,881 A | 11/1974 | Mueller et al. | 260/80.77 |
| 3,893,987 A | 7/1975 | Chandrasekaran | 260/80.77 |
| 4,308,359 A | 12/1981 | Büning | 525/276 |
| 4,524,197 A * | 6/1985 | Khan | 526/206 |
| 4,990,406 A | 2/1991 | Kappler et al. | 428/422 |
| 5,030,394 A | 7/1991 | Sietses et al. | |
| 5,051,345 A | 9/1991 | Haraga et al. | 430/505 |
| 5,060,394 A | 10/1991 | Lincoln et al. | 33/763 |
| 5,200,480 A | 4/1993 | Maruyama et al. | 526/249 |
| 5,292,816 A | 3/1994 | Metz et al. | 525/276 |
| 5,496,889 A | 3/1996 | Schlund et al. | 525/166 |
| 5,723,556 A * | 3/1998 | Jones | 526/254 |
| 5,756,230 A | 5/1998 | Gao et al. | |
| 5,922,833 A | 7/1999 | Desimone | |
| 6,258,907 B1 | 7/2001 | Funaki et al. | |
| 6,342,569 B1 | 1/2002 | Manzoni et al. | 526/249 |
| 6,362,271 B1 | 3/2002 | Lin et al. | 524/520 |
| 6,924,344 B2 * | 8/2005 | Bauerle et al. | 526/255 |

OTHER PUBLICATIONS

Crivello et al.; "*Transition Metal-Catalyzed Tandem Isomerization and Cationic Polymerization of Allyl Ethers. I. Discovery and Scope*"; J Polymer Sci A: Polym. Chem; (1997) 35; pp. 1593-1604.
International Search Report and Written Opinion dated May 21, 2008.
Kim et al., "A Study to Determine the Existence of an Azeotropic R-22 "Drop-In" Substitute," prepared by U.S. Department of Commerce for Electric Power Research Institute, Mar. 1996, pp. 1-45.
Morrison et al., "Azeotropy in Refrigerant Mixtures," International Journal of Refrigeration (1993), vol. 16, No. 2, pp. 129-138.

* cited by examiner

*Primary Examiner* — Nicole M Bui-Hatcher
(74) *Attorney, Agent, or Firm* — Kenyon & Kenyon LLP

(57) ABSTRACT

A process for the preparation of a fluoroolefin polymer from an azeotropic mixture of monomers having a constant composition, the process including the step of:
contacting in a reaction zone:
(i) an initiator; and
(ii) an azeotropic mixture of monomers including at least one fluoroolefin and, optionally, at least one ethylenically unsaturated comonomer capable of copolymerizing therewith;
wherein the contacting is carried out at a temperature, pressure and length of time sufficient to produce the fluoroolefin polymer.

13 Claims, No Drawings

POLYMER PROCESSING SIMPLIFICATION

CROSS-REFERENCE TO A RELATED APPLICATION

The present application claims priority from U.S. Provisional Patent Application No. 60/871,035, filed Dec. 20, 2006, which is incorporated herein by reference.

BACKGROUND OF THE INVENTION

1. Field of the Invention

The present invention generally relates to a process for making fluoroolefin homopolymers, copolymers, terpolymers, and blends thereof, employing a single feed of an azeotropic mixture of monomers having a constant composition wherein the azeotropic mixture of monomers includes at least one fluoroolefin and optionally, a comonomer capable of copolymerizing therewith. More particularly, the present invention relates to fluoroolefin homopolymers, copolymers, terpolymers, and blends thereof, prepared by the present process, which employs the azeotropic mixture of monomers of the present invention.

2. Description of the Prior Art

Fluorine-containing polymers and copolymers are described in U.S. Pat. No. 2,970,988. Vinylidene fluoride copolymers are described in U.S. Pat. No. 3,893,987 (see Example 2) and process is described in U.S. Pat. No. 3,240,757. VDF/CTFE copolymers are described in U.S. Pat. Nos. 5,292,816 and 3,053,818 (see Example 6).

Other copolymers made from fluoroolefins are described in U.S. Pat. Nos. 3,812,066; 2,599,640; 6,342,569; 5,200,480; and 2,919,263.

Fluorocarbon/Acrylate Coatings are described in U.S. Pat. No. 3,716,599 and powder coating are described in U.S. Pat. No. 5,030,394.

Solvent based blending is described in U.S. Pat. No. 3,324,069. Polyvinylidene fluoride/polymethyl methacrylate blends are described in U.S. Pat. No. 6,362,271. Other blends are described in U.S. Pat. Nos. 5,051,345; 5,496,889 (Compatibilized Blends); 4,990,406 (F-terpolymer/acrylate blends). Graft Copolymers are described in U.S. Pat. No. 4,308,359.

Use of fluoro monomers as thermal stress-crack relievers is described in U.S. Pat. No. 3,847,881. 2-Chloropentafluoropropene is described in U.S. Pat. Nos. 2,915,510 (see Example 4); 2,917,497 (see Example 11); and 2,975,164 (see Example 7).

However, none of these references describes preparation of fluorine-containing polymers, copolymers, terpolymers, and blends thereof, prepared by a process, which employs an azeotropic mixture of monomers having a constant composition as the feed stream.

In view of the high cost of the fluoro monomer starting materials, there is a need in industry to develop a general and commercially feasible process for making such fluorine-containing polymers and exploring their properties and uses in various applications.

To achieve this objective, the present invention provides a practical process, which is capable of introducing the reactants into the reaction zone in a single stream having a constant composition.

For this reason, the process according to the present invention is potentially useful commercially.

SUMMARY OF THE INVENTION

The present invention provides a process for the preparation of a fluoroolefin polymer from an azeotropic mixture of monomers having a constant composition.

The process including the step of:
contacting in a reaction zone:
(i) an initiator; and
(ii) an azeotropic mixture of monomers including at least one fluoroolefin and, optionally, at least one ethylenically unsaturated comonomer capable of copolymerizing therewith;

wherein the contacting is carried out at a temperature, pressure and length of time sufficient to produce the fluoroolefin polymer.

The process according to the present invention is capable of introducing the reactants into the reaction zone in a single stream having a constant composition and, as such, it is practical, and has the potential to be useful commercially.

These and other benefits of the present invention will become more evident from detailed description of the preferred embodiments that follow.

DETAILED DESCRIPTION OF THE PREFERRED EMBODIMENTS

The present invention provides a process for the preparation of a fluoroolefin polymer from an azeotropic mixture of monomers having a constant composition.

The process includes the step of contacting in a reaction zone an initiator and an azeotropic mixture of at least two monomers comprising at least one fluoroolefin and, optionally, at least one ethylenically unsaturated comonomer capable of copolymerizing therewith.

The step of contacting is carried out at a temperature, pressure and length of time sufficient to produce said fluoroolefin polymer.

The reaction zone can further comprises a solvent selected from ethyl acetate, butylacetate, toluene, xylene, methyl ethyl ketone, 2-heptanone, 1-methoxy-2-propanol acetate, 1,1,1-trichloroethane and mixtures thereof.

In a preferred embodiment of the present process, the azeotropic mixture of the monomers comprise at least two fluoroolefin monomers selected from fluoroolefins represented by the formula:

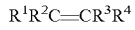

wherein each of $R^1$, $R^2$, $R^3$, and $R^4$ is independently selected from hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that at least one of the $R^1$, $R^2$, $R^3$, and $R^4$ groups is either fluorine or a fluorine-containing group.

Examples of the fluoroolefin monomer include $CF_3CF=CF_2$, $CF_3CH=CF_2$, $CF_3CF=CHF$, $CF_3CH=CH_2$, $CF_3CF=CH_2$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CF=CF_2$, $CF_3CF_2CF_2CH=CF_2$, $CF_3CF_2CF_2CF=CHF$, $CF_3CF_2CF_2CH=CH_2$, $CF_3CF_2CF_2CF=CH_2$, $CF_3CH=CHCF_3$, $CF_3CH=CFCF_3$, $CF_3CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CH=CHCl$, $CF_3CCl=CH_2$, $CF_3CCl=CHF$, $CF_3CCl=CF_2$, $CF_3CF=CHCl$, $CF_3CH=CFCl$, $CF_2=CFCl$, $CF_2=CF_2$, $CF_2=CH_2$, $CFH=CH_2$ and mixtures thereof.

Examples of the ethylenically unsaturated comonomer include fluoroolefin monomers or an alkene of 2-8 carbon atoms, acrylate or methacrylate ester of 4 to 24 carbon atoms, acrylonitrile, methacrylonitrile, vinyl ether, styrene, alphamethylstyrene, paramethyl styrene, allyl alcohol, methallyl alcohol, vinyl acetate, vinyl carboxylate of 5-24 carbon atoms, methyl ethyl ketone, and mixtures thereof.

Examples of the acrylate or methacrylate ester is selected from the group consisting of: methyl acrylate, ethyl acrylate, propyl acrylate, butyl acrylate, ethylhexylacrylate, methylmethacrylate, ethylmethacrylate, butylmethacrylate, ethylhexymethacrylate, and mixtures thereof.

Preferably, the fluoroolefin monomer is from about 30 wt % to about 70 wt % of the total weight of the polymer and the ethylenically unsaturated comonomer is from about 70 wt % to about 30 wt % of the total weight of the polymer.

In another preferred embodiment of the present process, the azeotropic mixture of the monomers comprise at least two fluoroolefin monomers, each of the fluoroolefin monomers being selected from a fluoroolefin represented by the formula:

$$R^1R^2C=CR^3R^4$$

wherein each of $R^1$, $R^2$, $R^3$, and $R^4$ is independently selected from hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that said fluoroolefin has at least one fluorine.

Examples of the fluoroolefin monomer include $CF_3CF=CF_2$, $CF_3CH=CF_2$, $CF_3CF=CHF$, $CF_3CH=CH_2$, $CF_3CF=CH_2$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CF=CF_2$, $CF_3CF_2CF_2CH=CF_2$, $CF_3CF_2CF_2CF=CHF$, $CF_3CF_2CF_2CH=CH_2$, $CF_3CF_2CF_2CF=CH_2$, $CF_3CH=CHCF_3$, $CF_3CH=CFCF_3$, $CF_3CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CH=CHCl$, $CF_3CCl=CH_2$, $CF_3CCl=CHF$, $CF_3CCl=CF_2$, $CF_3CF=CHCl$, $CF_3CH=CFCl$, $CF_2=CFCl$, $CF_2=CF_2$, $CF_2=CH_2$, $CFH=CH_2$, and mixtures thereof.

The azeotropic mixture of the monomers has a constant composition so that the azeotropic mixture of the monomers can be advantageously introduced as a single feed into the reaction zone.

The starting materials are known in the art and are generally available from commercial sources. Others can be prepared by known methods described in the chemical literature. For example, $CF_3CH=CHF$ can be made in large scale from commercially available $CF_3CH_2CF_2H$ according to methods described in U.S. Pat. No. 6,548,719 B1. $CF_3CH_2CF_2H$ is produced by and is available from Honeywell International, Inc., Morristown, N.J.

Preferably, $CF_3CH=CF_2$ is formed from $CF_3CH_2CF_2H$ by chlorination followed by dehydrochlorination and $CF_3CH=CHF$ is formed from $CF_3CH_2CF_2H$ by dehydrofluorination.

The step of contacting is typically carried out at a temperature, pressure and length of time sufficient to produce the desired fluoroolefin polymer.

The contacting is preferably carried out at a temperature from about 10° C. to about 80° C. and more preferably from about 20° C. to about 65° C. The contacting is preferably carried out at a pressure from about 50 psig to about 500 psig and more preferably about 85 psig to about 260 psig. The contacting is preferably carried out for a length of time from about 4 hours to about 20 hours and more preferably for about 6 hours to about 12 hours.

Another aspect of the process of the invention is use of selected free-radical initiators. Common initiators used for free radical polymerization of unsaturated monomers are generally satisfactory in the process of the invention depending on the nature and properties desired. For example, azo-type initiators result in high polydispersity in the molecular weight distribution whereas perester type peroxides produce a narrow molecular weight distribution and, as such, are preferably used in most cases.

Examples of the initiator include azobiscyanoacrylates, aliphatic peresters, such as, t-butyl peroctoate and t-amyl peroctoate, aliphatic peroxides, such as, tert-butyl peroxide, aliphatic hydroperoxides, such as, tert-butyl hydroperoxide, inorganic peroxides such as sodium peroxide, inorganic persulfates such as potassium persulfate, redox initiators involving persulfates as oxidant and sulfites such as sodium metabisulfite as reductant, percarbonates such as t-butylperoxide-2-ethylhexylcarbonate, peroxydicarbonates, perhaloacetyl peroxides and mixtures thereof.

Generally, the perester initiator is used at a concentration of less than 20 weight percent based on the weight of the total monomers, usually the perester initiator is used at concentrations less than 12 weight percent, with a range of from 0.1 to 1.0 weight percent being preferred.

Preferably, the perester initiator is added to the reaction zone together with the monomeric reactants, i.e., the azeotropic mixture of monomers, as previously stated. However, a minor amount of peroxide as a finishing step may be added after the polymerization reaction has substantially ended. Such a finishing step has the purpose of removing minor amounts of unreacted monomers and aids in achieving a reaction zone product that may be used directly for the desired end use or application.

Thus, it is important that at least 50, and preferably at least 80, weight percent of the peroxide to be added with the monomers and the balance of the initiator added during the polymerization reaction.

The polymerization process may be conducted in the presence of tertiary amine or a tertiary mercaptan-type chain transfer agent. The use a chain transfer agent may result in a copolymer of suitable molecular weight to have the required organic solvent solubility.

Generally, the chain transfer agent is used at a concentration of less than 5 weight percent based on the weight of monomers added to the reaction zone.

The reaction zone preferably has provision for agitation and heat exchange to assist uniformity and process control.

The process can be carried out as a continuous, batch, vapor phase, liquid phase, fixed bed, solution, emulsion, or a suspension type of a polymerization process.

The reaction zone can further include a diluent, such as, a solvent or mixture of solvents. Solvents used in non-aqueous polymerization methods are preferably, non-polar, non-reactive, non-polymerizable, non-protic solvents are used as the reaction medium. However, other solvents, such as, non-interfering non-polymerizable liquid which is a solvent both for the monomers and copolymer products of the invention. Suitable reaction solvents include esters, ketones, ethers, aromatic hydrocarbons, chlorinated hydrocarbons, aliphatic hydrocarbons, and mixtures thereof. Illustrative solvents are ethyl acetate, butylacetate, toluene, xylene, methyl ethyl ketone, 2-heptanone, and 1,1,1-tri-chloroethane. Mixtures thereof can also be employed. The aqueous polymerization reaction is preferably conducted using water-soluble initiators, buffers such as inorganic phosphates or carbonates to maintain required pH level, and emulsifiers such as salts of perfluoroalkyl carbonates or sulfonates.

In operation, preferably at least 10 wt % of the reactants are converted to the product. More preferably, up to at least 80 wt % of the reactants are converted to the product, and most preferably, at least 90 wt % of the reactants are converted to the product.

Operation of the process of the present invention under high conversion conditions is generally preferred, particularly under batch or solution, emulsion or suspension conditions. However, for continuous, vapor phase, or fixed bed reactions, the present process provides the unique advantage of recycling of the unreacted starting materials thereby providing a cost advantage over other known processes of the prior art.

Polymerization can be carried out essentially the same way as the methods known and described in the art, such as, the methods described in *J. Polymer Sci. A: Polym. Chem.* (1997) 35, 1593-1604, and in U.S. Pat. Nos. 2,970,988; 3,893,987 (see Example 2); 3,240,757; 5,292,816; 3,053,818 (see Example 6); 3,812,066; 2,599,640; 6,342,569; 5,200,480; and 2,919,263.

Thus, the fluoroolefins can be readily polymerized to form homopolymers under standard polymerization conditions known to a person skilled in the art.

Alternatively, the fluoroolefin monomers can be also readily polymerized to copolymers and terpolymers if one or more ethylenically unsaturated comonomer is present.

Thus, a variety of polymers, such as, homopolymers, copolymers, and terpolymers can be prepared by the process of the present invention.

Accordingly, the present invention also provides polymer blends comprising at least two polymers selected from homopolymers, copolymers, and terpolymers prepared by the process of the present invention.

Depending on the nature of the fluoroolefins and the ethylenically unsaturated comonomers, the composition of the copolymers and terpolymers, the polymerization conditions, and the molecular weights, the polymers can be obtained as colorless liquids or transparent or white powders.

The polymers, copolymers and terpolymers according to the present invention are useful in a variety of applications, including preparation of barrier materials and coatings.

The process can further include purifying the reaction product by precipitation or chromatography to obtain the product in substantially pure form.

The following non-limiting examples are illustrative of the various embodiments of the present invention. It is within the ability of a person of ordinary skill in the art to select other variable from amongst the many known in the art without departing from the scope of the present invention. Accordingly, these examples shall serve to further illustrate the present invention, not to limit them.

Experimental Details:

Unless otherwise indicated, all parts and percentages are on a weight basis.

Example

An azeotrope of CTFE and $CF_3CF=CH_2$ monomer combination. A typical polymerization is run in a stirred, stainless steel autoclave in which reactants are added by methods known in the art. To a 300 mL autoclave is added $(NH_4)_2S_2O_8$ ammonium persulfate: 15 mL of a solution of 0.56 g dissolved in 40 mL of de-$O_2$/DI water. $Na_2S_2O_5$ sodium metasulfite: 19 mL of a solution of 1.2 g dissolved in 40 mL of de-$O_2$/DI water.

$FeSO_4$ ferrous sulfate: 0.005 g dissolved buffer solution. $Na_2HPO_4$/$NaH_2PO_4$ buffer: 1.34/0.68 g dissolved 180 mL. $C_7F_{15}CO_2(NH_4)$ surfactant: 2.44 g dissolved with buffer.

Add 180 mL of the emulsion solution (water/$Na_2HPO_4$/$NaH_2PO_4$/$FeSO_4$/$C_7F_{15}CO_2(NH_4)$)).

The solution is stirred while 40.7 g as a mixture of 60 mol % $CF_3CF=CH_2$ and 40 mol % of CTFE are added in which an autogenous pressure is obtained at 10° C. The pressure is kept during the polymerization as to obtain a constant concentration of monomer. After 7 hours, the polymerization is stopped and monomers are released from the autoclave. The polymerization suspension is poured out and dried. 5.3 grams of a white copolymer was obtained.

The polymerization any combination of monomers may be combined in any combination to afford the properties suitable for the intended application or applications. Those skilled in the art may change the polymerization medium, catalyst, initiator system, temperature, pressure, monomer mole ratio and concentration to provide a suitable homopolymer, copolymer, terpolymer or others.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. A process for the preparation of a fluoroolefin polymer, said process comprising the step of:
   introducing an azeotropic mixture consisting of a first monomer and a second monomer into a reaction zone as a single feedstream having a constant composition; and
   contacting the azeotropic mixture with an initiator in the reaction zone, said contacting being carried out at a temperature, pressure and length of time sufficient to produce said fluoroolefin polymer;
   wherein the first monomer is a fluoroolefin monomer selected from the group consisting of $CF_3CF=CF_2$, $CF_3CH=CF_2$, $CF_3CF=CHF$, $CF_3CH=CH_2$, $CF_3CF=CH_2$, cis-$CF_3CH=CFH$, trans-$CF_3CH=CFH$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CH=CF_2$, $CF_3CF_2CF_2CF=CHF$, $CF_3CF_2CF_2CH=CH_2$, $CF_3CF_2CF_2CF=CH_2$, $CF_3CH=CHCF_3$, $CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CH=CHCl$, $CF_3CCl=CH_2$, $CF_3CCl=CF_2$, $CF_3CF=CHCl$, $CF_3CH=CFCl$, and $CF_2=CH_2$; and
   the second monomer is an ethylenically unsaturated comonomer selected from the group consisting of: alkene of 2-8 carbon atoms, acrylate or methacrylate ester of 4 to 24 carbon atoms, acrylonitrile, methacrylonitrile, vinyl ether, styrene, alphamethylstyrene, paramethyl styrene, allyl alcohol, methallyl alcohol, vinyl acetate, and vinyl carboxylate of 5-24 carbon atoms, and a mixture thereof.

2. The process of claim 1, wherein said reaction zone further comprises a solvent selected from the group consisting of: ethyl acetate, butylacetate, toluene, xylene, methyl ethyl ketone, 2-heptanone, 1-methoxy-2-propanol acetate, 1,1,1-trichloroethane and mixtures thereof.

3. The process of claim 1, wherein said acrylate or methacrylate ester is selected from the group consisting of: methyl acrylate, ethyl acrylate, propyl acrylate, butyl acrylate, ethylhexylacrylate, methylmethacrylate, ethylmethacrylate, butylmethacrylate, ethylhexymethacrylate, and mixtures thereof.

4. The process of claim 1, wherein the first monomer is selected from the group consisting of $CF_3CF=CF_2$, $CF_3CH=CF_2$, $CF_3CF=CHF$, $CF_3CH=CH_2$, $CF_3CF=CH_2$, cis-$CF_3CH=CFH$, trans-$CF_3CH=CFH$, and $CF_2=CFCl$.

5. The process of claim 1, wherein said fluoroolefin monomer is from about 30 wt % to about 70 wt % of the total weight of the polymer, and said ethylenically unsaturated comonomer is from about 70 wt % to about 30 wt % of the total weight of the polymer.

6. The process of claim 1, wherein said contacting is carried out at a temperature from about 10° C. to about 80° C.

7. The process of claim 1, wherein said contacting is carried out at a temperature from about 20° C. to about 65° C.

8. The process of claim 1, wherein said contacting is carried out at a pressure from about 50 psig to about 500 psig.

9. The process of claim 1, wherein said contacting is carried out at a pressure from about 85 psig to about 260 psig.

10. The process of claim 1, wherein said contacting is carried out at a length of time from about 4 hours to about 20 hours.

11. The process of claim 1, wherein said contacting is carried out at a length of time from about 6 hours to about 12 hours.

12. The process of claim 1, wherein said initiator is selected from the group consisting of azobiscyanoacrylates, aliphatic peresters, aliphatic peroxides, aliphatic hydroperoxides, inorganic peroxides, inorganic persulfates, redox initiators, percarbonates, peroxydicarbonates, perhaloacetyl peroxides, and mixtures thereof.

13. The process of claim 1, carried out as a continuous, batch, liquid phase, vapor phase, fixed bed, solution, emulsion, and suspension process.

* * * * *